(12) United States Patent
Oku

(10) Patent No.: US 9,407,101 B2
(45) Date of Patent: Aug. 2, 2016

(54) CHARGER AND ELECTRONIC APPARATUS SYSTEM

(71) Applicant: Panasonic Intellectual Property Corporation of America, Torrance, CA (US)

(72) Inventor: Hiroyuki Oku, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/599,334

(22) Filed: Jan. 16, 2015

(65) Prior Publication Data

US 2015/0123616 A1 May 7, 2015

Related U.S. Application Data

(63) Continuation of application No. 14/190,758, filed on Feb. 26, 2014, now Pat. No. 8,981,731.

(30) Foreign Application Priority Data

Oct. 24, 2013 (JP) ................ 2013-221329

(51) Int. Cl.
*H02J 7/00* (2006.01)
*H02J 7/02* (2016.01)
*H02J 7/04* (2006.01)

(52) U.S. Cl.
CPC ............. *H02J 7/0044* (2013.01); *H02J 7/0029* (2013.01); *H02J 7/027* (2013.01); *H02J 7/047* (2013.01); *H02J 2007/0037* (2013.01); *H02J 2007/0039* (2013.01)

(58) Field of Classification Search
CPC .......... H02J 7/0044; H02J 7/027; H02J 7/047
USPC ........................................... 320/114
See application file for complete search history.

(56) References Cited

U.S. PATENT DOCUMENTS 5,519,303 A 5/1996 Goedken et al.
5,684,663 A 11/1997 Mitter
(Continued)

FOREIGN PATENT DOCUMENTS

DE  692 28 918 T2  9/1999
DE  10 2009 034 886 A1  2/2011
(Continued)

OTHER PUBLICATIONS

Search Report dated Apr. 11, 2014, for corresponding GB Patent Application No. 1402617.3, 4 pages.
(Continued)

*Primary Examiner* — M'Baye Diao
(74) *Attorney, Agent, or Firm* — Seed IP Law Group PLLC

(57) ABSTRACT

A charger capable of charging an electronic apparatus includes a charger main body having a power output unit which output charging power, a connection unit which is attached to the charger main body, which is configured to be connected to the electronic apparatus, and which is configured to supply the charging power from the power output unit to the electronic apparatus in a state that the connection unit is connected to the electronic apparatus, and a temperature sensor which is provided in the connection unit, and which is configured to detect a temperature in the vicinity of the connection unit.

17 Claims, 9 Drawing Sheets

(56) References Cited

U.S. PATENT DOCUMENTS

| | | | |
|---|---|---|---|
| 5,767,659 A | 6/1998 | Farley | |
| 5,797,717 A | 8/1998 | Tanaka et al. | |
| 5,825,155 A | 10/1998 | Ito et al. | |
| 5,878,752 A * | 3/1999 | Adams | A24F 47/008 |
| | | | 131/194 |
| 6,075,343 A | 6/2000 | Hsu | |
| 6,075,346 A | 6/2000 | Kikuchi et al. | |
| 7,091,697 B2 | 8/2006 | Mader et al. | |
| 7,952,330 B2 | 5/2011 | Mori | |
| 7,973,513 B2 | 7/2011 | Wihlborg et al. | |
| 8,723,477 B2 | 5/2014 | Gaul et al. | |
| 8,729,856 B2 | 5/2014 | Nathan et al. | |
| 2002/0081486 A1 | 6/2002 | Williams | |
| 2004/0027093 A1 | 2/2004 | Tashiro et al. | |
| 2005/0058410 A1 | 3/2005 | Healy et al. | |
| 2005/0068038 A1* | 3/2005 | Hsiao | H02J 7/0044 |
| | | | 324/426 |
| 2005/0077878 A1* | 4/2005 | Carrier | B25F 5/00 |
| | | | 320/134 |
| 2007/0170888 A1 | 7/2007 | Hioki | |
| 2009/0072135 A1 | 3/2009 | Horikoshi et al. | |
| 2009/0195215 A1 | 8/2009 | Sato et al. | |
| 2009/0195237 A1 | 8/2009 | Feliss et al. | |
| 2011/0050175 A1 | 3/2011 | Odaohhara et al. | |
| 2012/0119702 A1 | 5/2012 | Gaul et al. | |
| 2012/0206840 A1 | 8/2012 | Goelz et al. | |
| 2012/0212179 A1 | 8/2012 | Nathan et al. | |
| 2012/0235631 A1 | 9/2012 | Nakashima et al. | |
| 2013/0063098 A1 | 3/2013 | Knowlton et al. | |
| 2013/0201316 A1 | 8/2013 | Binder et al. | |
| 2013/0335024 A1 | 12/2013 | Akai et al. | |
| 2014/0049218 A1 | 2/2014 | Morand et al. | |
| 2014/0073189 A1 | 3/2014 | Kondou et al. | |

FOREIGN PATENT DOCUMENTS

| | | |
|---|---|---|
| DE | 10 2010 022 140 A1 | 11/2011 |
| DE | 10 2012 200 523 A1 | 8/2012 |
| EP | 2 694 321 A1 | 2/2014 |
| EP | 2 706 628 A1 | 3/2014 |
| JP | 60-160034 A | 10/1985 |
| JP | 08-308139 A | 11/1996 |
| JP | 2005-294232 A | 10/2005 |
| JP | 2007-195021 A | 8/2007 |
| JP | 2007-325500 A | 12/2007 |
| JP | 2009-106010 A | 5/2009 |
| JP | 2010-268668 A | 11/2010 |
| JP | 2011-054342 A | 3/2011 |
| JP | 2011-114955 A | 6/2011 |
| JP | 2011-139572 A | 7/2011 |
| JP | 2012-147642 A | 8/2012 |
| JP | 2012-196120 A | 10/2012 |
| KR | 10-2012-0006635 A | 1/2012 |
| WO | 2009/040998 A1 | 4/2009 |

OTHER PUBLICATIONS

Search Report dated Apr. 14, 2014, for corresponding GB Patent Application No. 1402460.8, 5 pages.

Johannsen, "Einer far alle: Micro-USB wird Standard far Handy-Ladegerate," article from German IT website "Netzwelt," (http://www.netzwelt.de/news/79492-micro-usb-standard-handy-ladegeraete.html), dated Feb. 18, 2009 (4 pages).

German Office Action dated Mar. 29, 2016, for corresponding German Application No. 10 2014 203 503.1, 10 pages. [With English Translation].

* cited by examiner

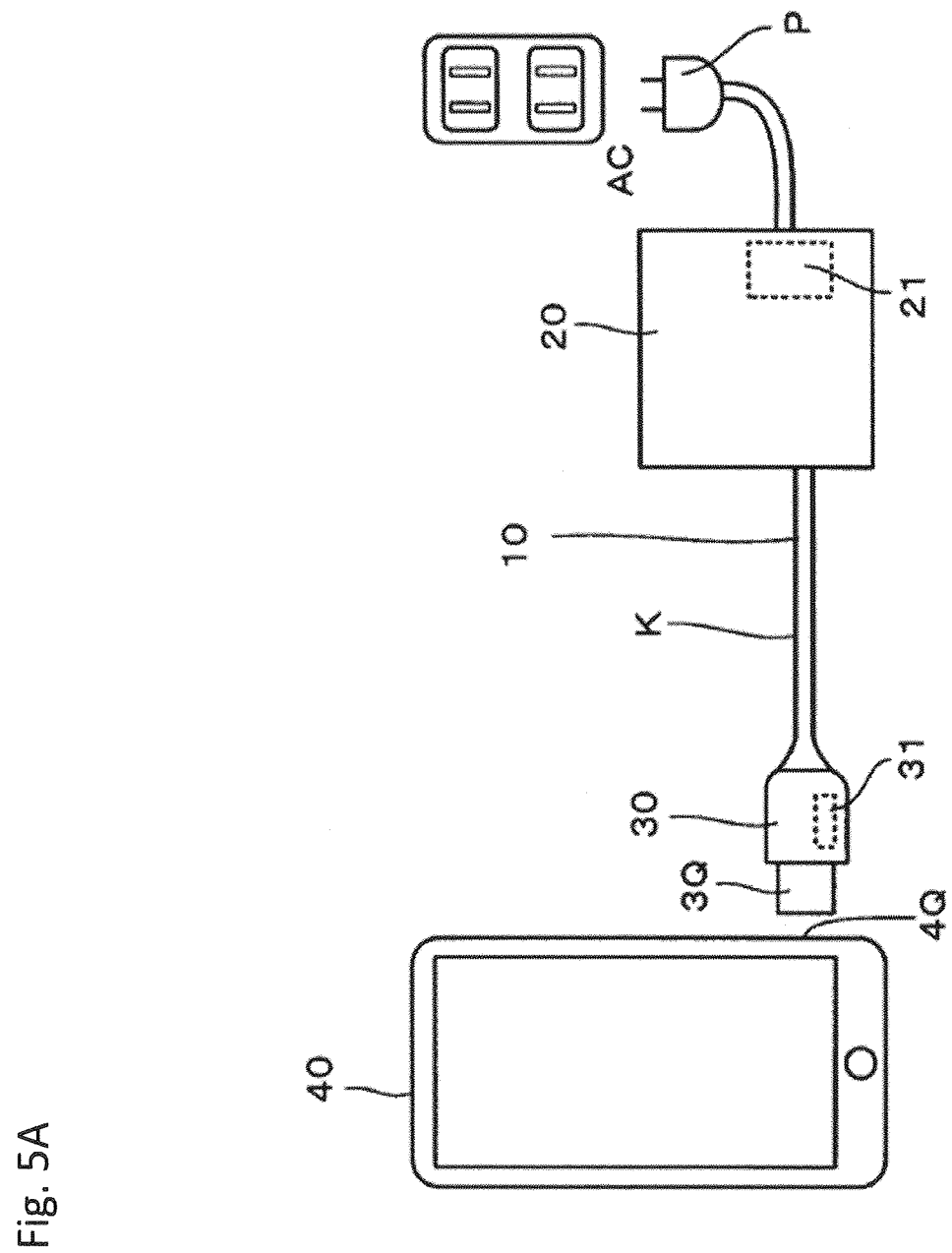

CHARGER AND ELECTRONIC APPARATUS SYSTEM

BACKGROUND

The present disclosure relates to a charger for charging a secondary battery of a portable terminal or the like as well as to an electronic apparatus system including the charger.

Chargers capable of charging an electronic apparatus including portable ones are now available in a variety of shapes. A secondary battery incorporated in an electronic apparatus is charged by connecting a charger to the electronic apparatus. Various proposals have been made to secure the safety during charging (refer to JP-A-8-308139, JP-A-2007-195021, JP-A-2007-325500, JP-A-2011-139572, for example).

In JP-A-8-308139, a constant current regulation circuit, a constant voltage regulation circuit, a control unit, etc., are provided in a charger. For quick charging of a secondary battery, the danger due to heat generation by the secondary battery is lowered by setting thermal cutoff temperature stages according to the temperature of the secondary battery.

In JP-A-2007-195021, a portable terminal apparatus is equipped with an authentication circuit, a built-in power source for supplying power to the authentication circuit, and a power managing means for shutting off the supply of power from an external power source to the terminal main body and supplying power to the authentication circuit from the built-in power source during authentication of the external power source. The terminal main body can be protected by abstaining from using an external power source to be authenticated, and power consumption of the built-in power source that is used for authentication can be reduced by supplying power from it only during an authentication period.

In JP-A-2007-325500, a power supply device is equipped with a receiving means for receiving internal temperature data of a charging/discharging device, a temperature measuring means for measuring its own internal temperature, and a power supply mode switching means for switching the mode of power supply to the charging/discharging device on the basis of the internal temperature data. A battery pack can be charged in a charging mode that is suitable for a temperature condition by measuring its temperature. This makes it possible to suppress charging capacity reduction due to an overcurrent that occurs when the battery pack is charged in a state that its temperature is out of a proper range.

In JP-A-2011-139572, a charging coupler is equipped with a plug connected to a charger outside a vehicle, a socket connected to the plug inside a vehicle, and a temperature sensor equipped in the plug or the socket. The charging coupler comprises a positive terminal containing unit containing a positive power line terminal, a negative terminal containing unit containing a negative power line terminal, and a temperature detecting mean containing unit, which is disposed between the positive terminal containing unit and the negative terminal containing unit, storing a temperature sensor. It's being developed to be downsized and improve the accuracy of the temperature detection.

To secure the safety during charging, proposals have been made in which a threshold value is set in the temperature range of a secondary battery or the like for its charging (refer to JP-A-8-308139, JP-A-2007-195021, JP-A-2007-325500, JP-A-2011-139572). However, whereas the connection units between chargers and electronic apparatus are being miniaturized, no techniques have been proposed which take into consideration the situation that the danger due to heat generation that is caused by short-circuiting that is induced by dust, water, etc. is increasing.

SUMMARY

The present disclosure has been made in the above circumstances, and an object of the present disclosure is therefore to provide a charger and an electronic apparatus system which can eliminate the risk of short-circuiting etc. in the vicinity of the connection unit between the charger and an electronic apparatus.

The present disclosure provides a charger capable of charging an electronic apparatus, comprising a charger main body including a power output unit which outputs charging power and a control unit which controls the power output unit, a positive-side charging path for outputting, to the electronic apparatus, the charging power supplied from the power output unit, a negative-side charging path which is electrically connected to a ground of the charger main body, a connection unit which is attached to the charger main body and is capable of being connected to the electronic apparatus, the connection unit containing portions of the positive-side charging path and the negative-side charging path respectively extended from the charger main body, a temperature sensor which is arranged in the vicinity of the portions of the positive-side charging path in the connection unit, and a first signal line which communicates temperature information detected by the temperature sensor. The connection unit includes a metallic outer wall which surrounds outside of the portion of the positive-side charging path and the negative-side charging path, and at least the portion of the negative-side charging path is electrically connected to the metallic outer wall. The control unit is capable of receiving the temperature information from the temperature sensor through the first signal line regardless of presence or absence of the connection to the electronic apparatus, and stops the output of the charging power from the power output unit if temperature detected by the temperature sensor is higher than or equal to a prescribed temperature.

For example, at least a portion of the temperature sensor is not surrounded by the metallic outer wall.

For example, the control unit further comprises an output suspending unit which suspends the output of the charging power from the power output unit if the temperature detected by the temperature sensor is higher than or equal to the prescribed temperature, an output suspension state maintaining unit which maintains an output suspension state of the charging power, and an output suspension state canceling unit which cancels the output suspension state of the charging power maintained by the output suspension state maintaining unit when receiving a suspension state cancellation signal.

For example, the control unit further comprises an output suspending unit which suspends the output of the charging power from the power output unit if the temperature detected by the temperature sensor is higher than or equal to the prescribed temperature and an output suspension state maintaining unit which maintains an output suspension state of the charging power. The output suspension state of the charging power that has been maintained by the output suspension state maintaining unit is canceled, if an external supply of power to the charger main body is stopped in the output suspension state of the charging power.

For example, the charger further comprises at least one second signal line which is arranged between the positive-side charging path and the negative-side charging path in at least the connection unit and capable of receiving a different data than temperature information from the electronic apparatus.

For example, the charger main body and the connection unit are connected to each other through a charging cable, which is independent of the charger main body and the connection unit, and the charging cable comprises the positive-side charging path, the negative-side charging path, and the first signal line.

For example, the charger main body and the connection unit are connected to each other through a charging cable, which is independent of at least the charger main body and the connection unit, and the charging cable comprises at least the positive-side charging path, the negative-side charging path, the first signal line, and the second signal line.

For example, at least one signal line is an exclusive line for communicating the temperature information of the temperature sensor.

For example, the charger main body and the connection unit form a universal serial bus interface, through which the charger is capable of charging the electronic apparatus. An electronic apparatus system comprises the charger and an electronic apparatus.

BRIEF DESCRIPTION OF THE DRAWINGS

FIGS. 5A and 5B are schematic diagrams of electronic apparatus systems and chargers included therein according to first and second specific embodiments of the present disclosure, respectively.

DETAILED DESCRIPTION OF EXEMPLARY EMBODIMENTS

A charger and an electronic apparatus system according to preferred embodiments of the present disclosure will be hereinafter described in detail with reference to FIGS. 1 to 6.

Figure 1:
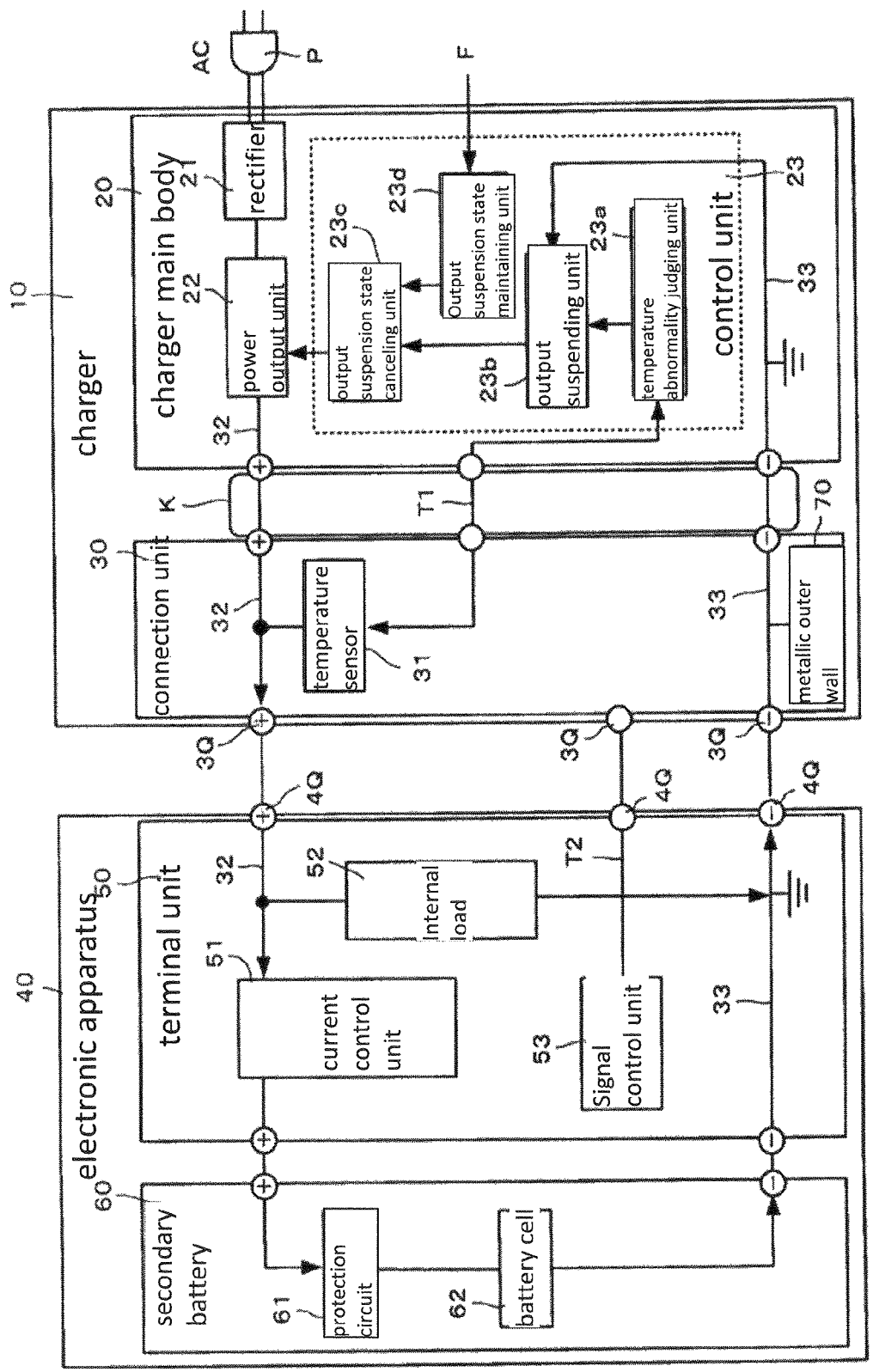
FIG. 1 is a block diagram of an electronic apparatus system and a charger incorporated therein according to a first specific embodiment of the present disclosure.

FIG. 1 is a block diagram of an electronic apparatus system and a charger incorporated therein according to the first embodiment of the present disclosure. The electronic apparatus system comprises a charger 10 and an electronic apparatus 40. The charger 10 comprises a charger main body 20 and a connection unit 30. The electronic apparatus 40 comprises a terminal unit 50 and a secondary battery 60.

The charger main body 20 is equipped with a plug P which can be electrically connected to an external commercial AC power line, a rectifier 21, a power output unit 22, a control unit 23. And the control unit 23 is equipped with a temperature abnormality judging unit 23a, an output suspending unit 23b, an output suspension state maintaining unit 23c, and an output suspension state canceling unit 23d. The connection unit 30 is shaped like a connector (e.g., USB (Universal Serial Bus) connector) so as to be electrically connectable to the electronic apparatus 40 and is partially surrounded (enclosed) with a metallic outer wall 70 (described later). If the connection unit 30 is a USB connector, the charger main body and the connection unit form a universal serial bus interface, through which the charger is capable of charging the electronic apparatus. And the charger main body 20 and the connection unit 30 are connected to each other through a charger cable K, which is independent of the charger main body 20 and the connection unit 30. The connection unit 30 is equipped with a temperature sensor 31 which is arranged in the vicinity of a positive-side charging path 32 connected to the power output unit 22 and formed in the connection unit 30. The temperature sensor 31 is connected to the positive-side charging path 32. For example, a thermistor can be used as the temperature sensor 31. The connection unit 30 is equipped with a negative-side charging path, which is electrically connected to the control unit 23, corresponding to the positive-side charging path. A portion of the negative-side charging path is electrically connected to the metallic outer wall 70. The connection unit 30 is equipped with plural charging terminals 3Q which are exposed from the connection unit 30 and are to be electrically connected to respective charging terminals 4Q of the electronic apparatus 40 (described later).

The charger main body 20 and the connection unit 30 are electrically connected to each other by a charging cable K, which has the positive-side charging path 32, the negative-side charging path 33, the first signal lines T1 which communicates temperature detected by the temperature sensor 31 to the charger main body 20. The first signal lines T1 of the charging cable K may be independently provided lines which are dedicated to notification of temperature information and have a different specification than general-purpose signal lines. The charger main body 20 has the rectifier 21 as mentioned above. However, in the case of a portable charger having dry cells B or the like as a power source, the above-mentioned rectifier 21 behaves as a power source.

The rectifier 21 is an AC/DC converter. The power output unit 22 outputs power that is suitable for the electronic apparatus 40 to be charged using power produced by the rectifier 21 through conversion. The temperature abnormality judging unit 23a judges whether or not a temperature increase detected by the temperature sensor 31 is abnormal, that is, larger than a threshold value. If the temperature abnormality judging unit 23a judges that a temperature detected by the temperature sensor 31 is higher than or equal to a prescribed temperature, the output suspending unit 23b suspends output of charging power from the power output unit 22. The output suspension state maintaining unit 23c maintains an output suspension state of charging power. The output suspension state canceling unit 23d cancels an output suspension state that has been maintained by the output suspension state maintaining unit 23c upon reception of a suspension state cancellation signal. In the case of a portable charger having dry cells B or the like as a power source, the above-mentioned rectifier 21 behaves as a power source.

The electronic apparatus 40 is a cellphone such as a smartphone, an information terminal such as a tablet PC, a portable terminal with a camera, a digital camera, a measuring instrument, or a detector, or the like. The terminal unit 50 of the electronic apparatus 40 is equipped with a current control unit 51 for controlling a charging current, an internal load 52 that occurs in association with operation of various circuits etc. for, for example, controlling the terminal unit 50 and a signal control unit 53 where images, texts, and the like are processed. Furthermore, the terminal unit 50 is equipped with a second signal line T2 which transmits and receives signals to and from the signal control unit 53, the positive-side charging path 32, the negative-side charging path 33, and the plural charging terminals 4Q which are exposed from the terminal unit 50.

A secondary battery 60 is charged by power that is supplied from the external charger 10, for example, and causes various units provided in the electronic apparatus 40 to operate on energy stored thereby by charging. The secondary battery 60 is equipped with a protection circuit 61 for protecting the secondary battery 60 from an abnormality such as overcharging that may occur during charging of the secondary battery 60 and battery cells 62 such as a lithium-ion buttery or a nickel-hydrogen battery.

Figure 2:
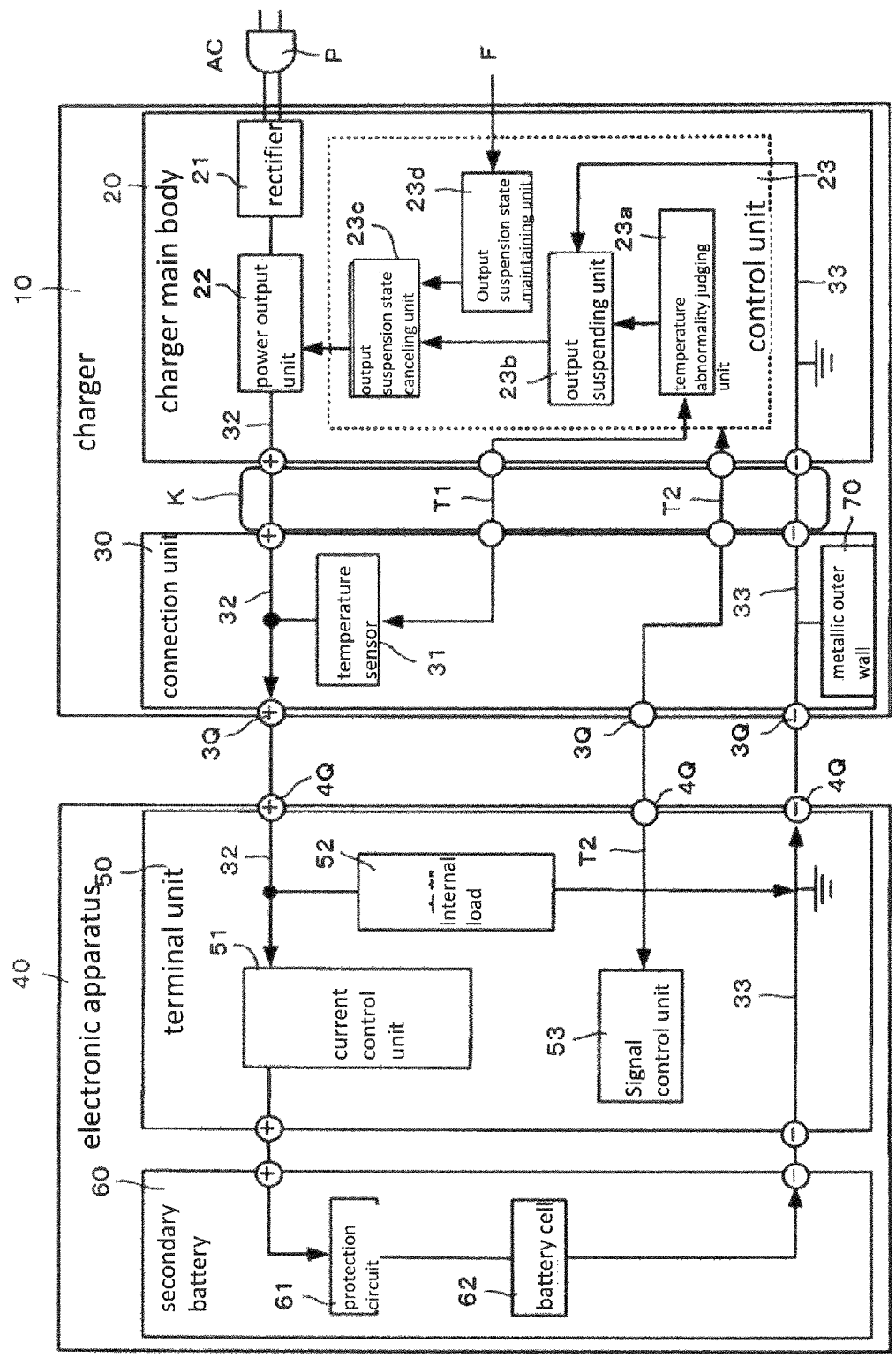
FIG. 2 is a block diagram of an electronic apparatus system and a charger incorporated therein according to a second specific embodiment of the present disclosure.

FIG. 2 is a block diagram of an electronic apparatus system and a charger incorporated therein according to a second specific embodiment of the present disclosure.

The difference from the first specific embodiment is that a second signal line T2 extended from the signal control unit 53 is electrically connected to the control unit 23 of the charger 10 via the charging cable K. The signal control unit 53 processes images, texts, and the like as described previously, furthermore the signal control unit 53 may transmit, to the charger 10, a model recognition signal of the electronic apparatus 40 or the like via the second signal line T2. The charger 10, which receives the model recognition signal, is able to supply charging power that is suitable for the model of the electronic apparatus 40 which is connected to the charger 10. It means that the charger 10 is able to configure the voltage adjusted to the electronic apparatus 40 and change the voltage according to time and the charging condition during quick charging.

Figure 3A:
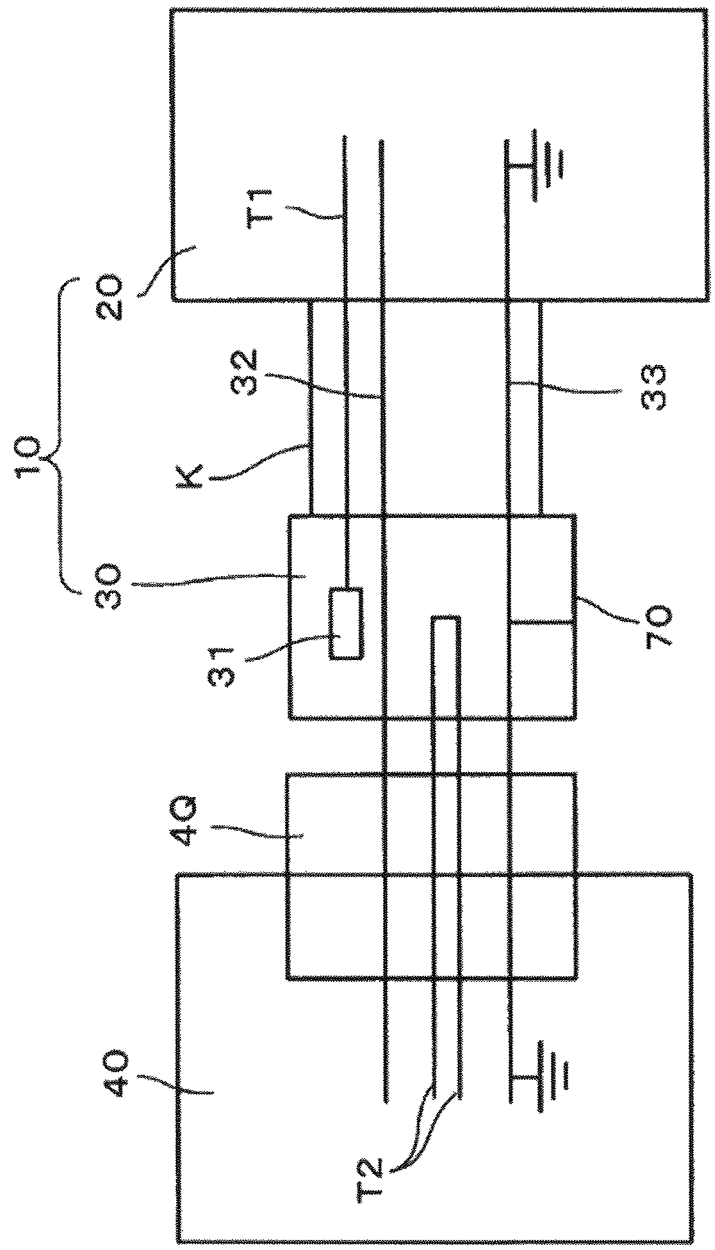
FIGS. 3A and 3B are conceptual diagrams showing embodiments of charging paths and signal lines of FIG. 1 in a first specific embodiment and FIG. 2 in a second specific embodiment.
Figure 3B:
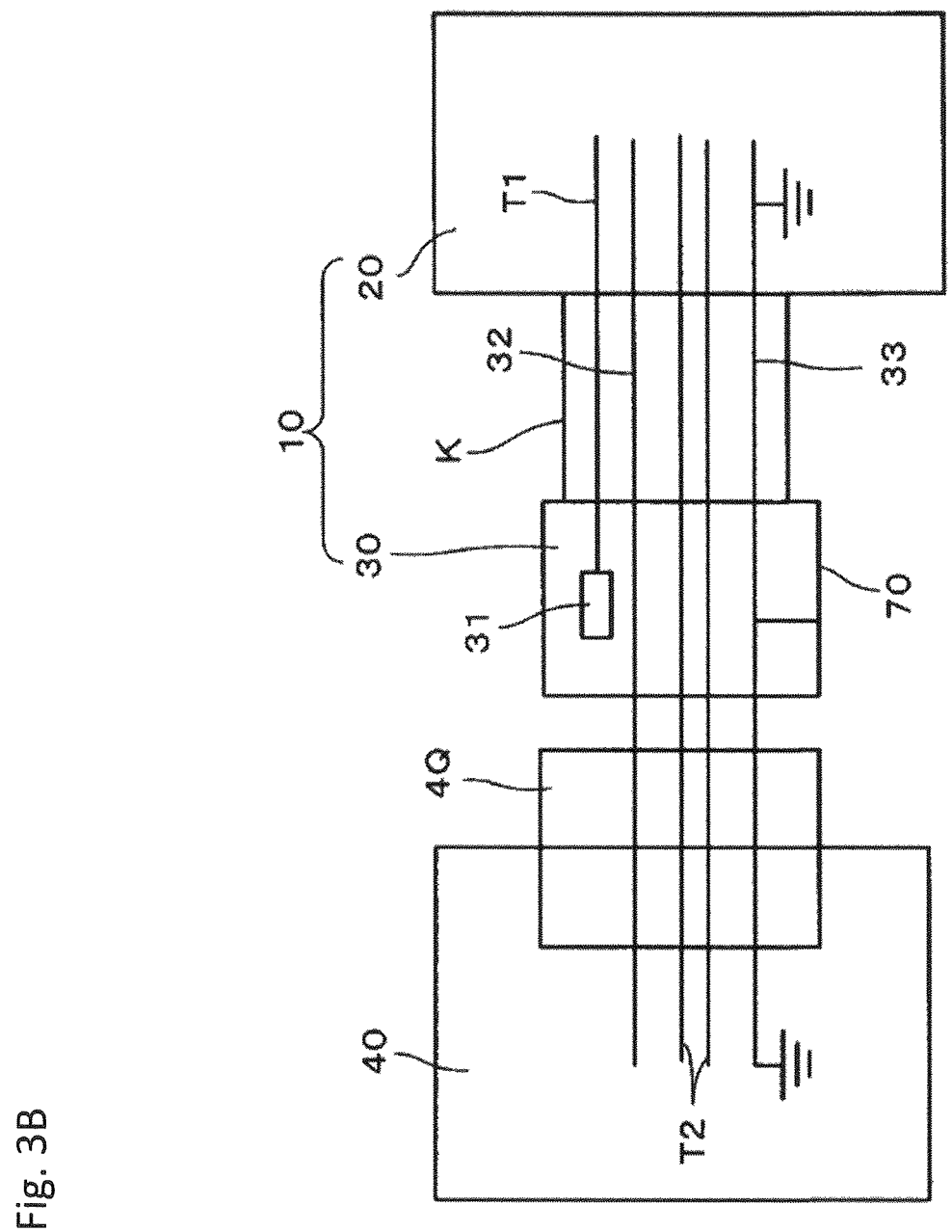

FIGS. 3A and 3B are conceptual diagrams showing embodiments of charging paths and signal lines of FIG. 1 and FIG. 2 in first and second specific embodiments.

The temperature sensor 31 is arranged in the vicinity of the positive-side charging path 32 of the connection unit 30 and the first signal line T1, which is extended from the temperature sensor 31, is extended to the charger main body 20 via the charging cable K. And the positive-side charging path 32 and the negative-side charging path 33 extend from the charger main body 20 to the electronic apparatus 40 via the charging cable K, the connection unit 30 continuously. The negative-side charging path 33 is electrically and physically connected to the metallic outer wall 70 of the connection unit 30 through a metallic conductor. Therefore, portions of the positive-side charging path 32 and the negative-side charging path 33, which are extended from the charger main body 20, are contained in the connection unit 30.

The positive-side charging path 32 and the negative-side charging path 33 are substantially parallel, and the temperature sensor 31 and the first signal line T1 are also substantially parallel accordingly. Therefore, the electrical wiring is simple, and the temperature sensor 31 can properly detect heat from the positive-side charging path 32.

In the second specific embodiment, a pair of the second signal line T2 is arranged between the positive-side charging path 32 and the negative-side charging path 33 and is electrically extended from the electronic apparatus 40 to the charger main body 20 via the connection unit 30 and the charging cable K as shown in FIG. 3B. And the second signal line T2 is also substantially parallel to the positive-side charging path 32 and the negative-side charging path 33. The second signal line T2, which is extended from the electronic apparatus 40, may be influenced by noises and heat because it is arranged between the positive-side charging path 32 and the negative-side charging path 33. However, the voltage level of the charging power lines of electronic apparatus or the like, which is, for example, from 5V to about 12V as with a USB interface (e.g., USB 3.0), is much smaller than that of chargers for electrical cars (e.g., 72V or so) as shown in JP-A-2011-139572. Therefore, an area of signal lines and an area of charging power lines don't need to be separated in order to obtain the predetermined property unlike in the case of charging power lines of chargers for electrical cars. The second signal line T2 is arranged between the positive-side charging path 32 and the negative-side charging path 33 with a gap. The positive-side charging path 32 and the negative-side charging path 33 are arranged with gap and the temperature sensor 31 is arranged in the vicinity of a portion of the positive-side charging path 32 of the connection unit 30. Therefore the specific effect of this invention (detecting an increase in temperature promptly and appropriately) is preferably obtained.

In the first specific embodiment, a pair of the second signal line T2, which is U-shape, is not electrically connected to the charger main body 20 and is folded back at the connection unit 30 when the charger 10 and the electronic apparatus 40 are connected to each other as shown in FIG. 3A. The pair of the second signal line T2 is folded back by causing a short circuit between the pair of the second signal lines T2, therefore for example about 200Ω resistance (short-circuit resistance) is arranged in the connection unit 30. The second signal line 20 may be folded back by causing a short circuit via the short-circuit resistance as shown in FIG. 4A.

In FIG. 3, the second signal lines T2 is described as differential signal lines consisting of a pair of signal lines. In a case of USB interface, each of the pair of signal lines respectively corresponds to D+ line and D− line. In the first specific embodiment, when the signal control unit 53 of the electronic apparatus 40 transmits a signal via the second signal line T2, the signal is returned with no change from the connection unit 30 of the charger 10 to the electronic apparatus 40 as shown in FIG. 3A. Therefore, the charger 10 doesn't operate on the basis of a signal from the signal control unit 53 in a practical way.

On the other hand, in the second specific embodiment (FIG. 3B), a signal, which is outputted from the signal control unit 53 of the electronic apparatus 40, is transmitted to the control unit 23 of the charger 10 via the second signal line T2. Therefore, the charger 10 is able to operate on the basis of a signal from the signal control unit 53. For example, the charger 10 is able to determine the model of the electronic apparatus 40 and the charging status of the secondary battery 60 on the basis of the signal transmitted from the signal control unit 53. The charger 10 is able to set or change a charging current and a charging voltage properly of the electronic apparatus 40 on the basis of the information of this judgment. Furthermore, a signal transmitted from the signal control unit 53 may function as an authentication signal of the electronic apparatus 40, and the charger 10 may have an authentication feature of the electronic apparatus 40.

Figure 4A:
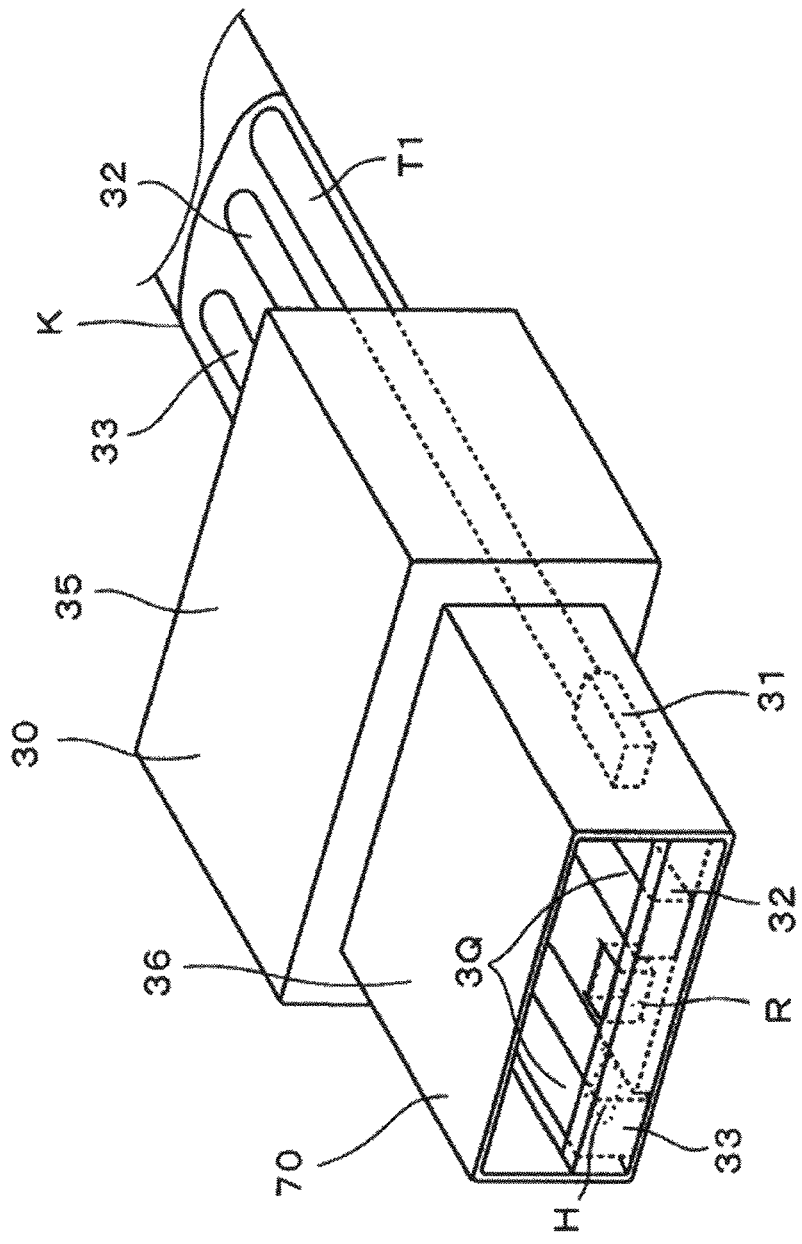
FIGS. 4A and 4B are conceptual diagrams showing embodiments of connection units of an electronic apparatus system and a charger incorporated therein in first and second specific embodiments.
Figure 4B:
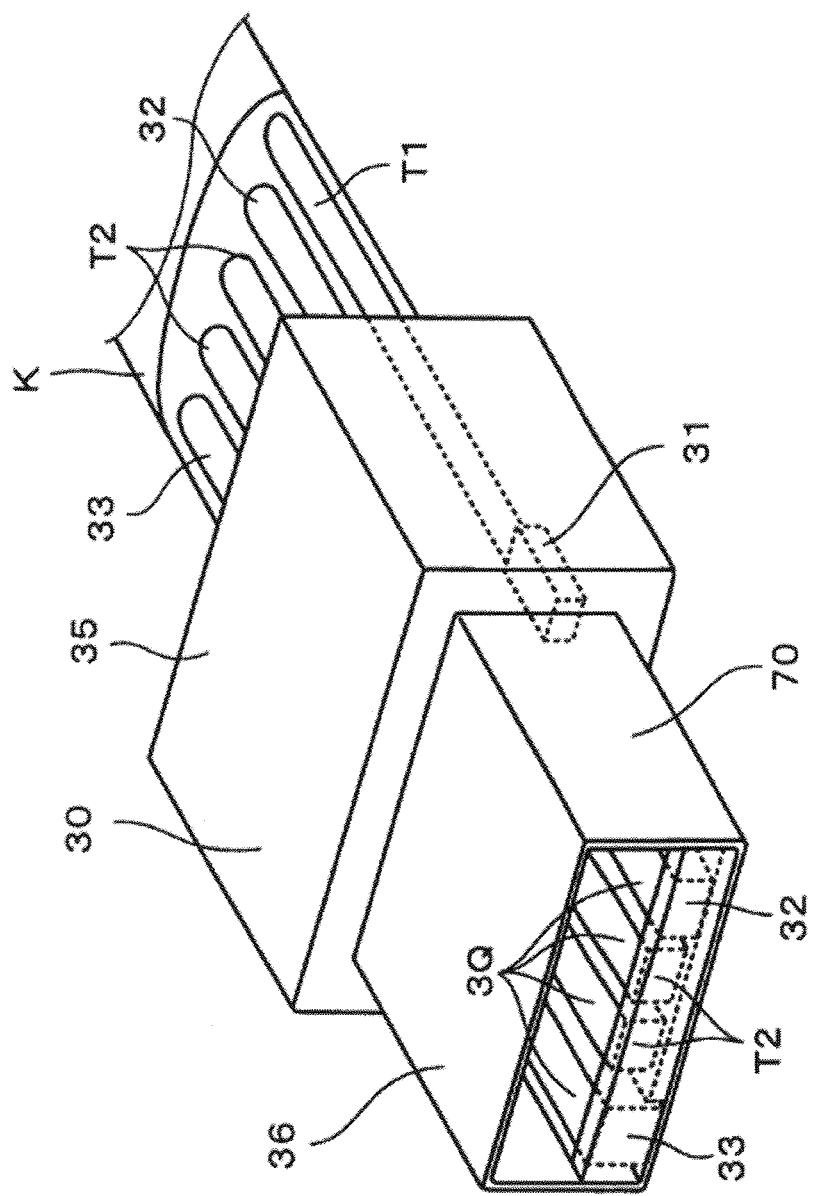

FIGS. 4A and 4B are conceptual diagrams showing embodiments of connection units of an electronic apparatus system and a charger incorporated therein in first and second specific embodiments.

The connection unit 30 comprises a connection unit main body 35 and a terminal 36. The connection unit main body 35 is formed of synthetic resin or the like, and the terminal 36 is surrounded by the conductible metallic outer wall 70 and a plurality of charging terminals 3Q are exposed therein. The tip of the exposed charging terminals 3Q of the charger 10 is molded out of synthetic resin or the like. The charging terminals 3Q comprise the positive-side charging path 32, the negative-side charging path 33, and the second signal line T2. However, the charging terminals 3Q don't need to comprise the second signal line T2 as shown in FIG. 4A. In the first embodiment, the short-circuit resistance R is arranged in the connection unit 30 because a pair of the signal line T2 is folded back by causing a short circuit. When the connection unit 30 is connected to the electronic apparatus 40, the pair of the signal line T2 gets connected to the short-circuit resistance R.

The temperature sensor 31 is molded and fixed in the connection unit main body 35. In the first specific embodiment, the temperature sensor 31 is arranged in the terminal 36 and the metallic outer wall 70 surrounds outside of portions of the positive-side charging path 32, the negative-side charging path 33, and the first signal line T1. However, at least a portion of the temperature sensor 31 doesn't need to be surrounded by the metallic outer wall 70 as described in the second specific embodiment (FIG. 4B).

In the second specific embodiment, the temperature sensor 31 is arranged in the connection unit main body 35 and the temperature sensor 31 isn't surrounded by the metallic outer wall 70 in the connection unit 30 due to the ease of manufacture as shown in FIG. 4B. As shown in FIG. 4A, the temperature sensor 31 may be arranged in the terminal 36 and may be surrounded by the metallic outer wall 70.

The temperature sensor 31 is arranged in the vicinity of the positive-side charging path 32 that outputs charging power, which the power output unit 22 outputs, to the electronic apparatus 40. On the other hand, the negative-side charging path 33 is electrically connected to the metallic outer wall 70 through a metallic conductor. It means that the negative-side charging path 33 is physically (mechanically) and electrically connected to the metallic outer wall 70 through a metallic conductor. Therefore, the heat conduction between the negative-side charging path 33 and the metallic outer wall 70 is high. In this embodiment, the negative-side charging path 33 is electrically connected and physically fixed to the metallic outer wall 70 by solder H as a metallic conductor. However the place of connecting and the way of fixing between the negative-side charging path 33 and the metallic outer wall 70 is not limited to.

As a result, the negative-side charging path 33 and the metallic outer wall 70 may be considered to be practically integrated, and the path area of a negative-side charging path 33 is very much larger and has higher heat capacity (e.g., by a factor of about 100) than that of the positive-side charging path 32 as comparing the path area of a positive-side charging path 32 and the path area of a negative-side charging path 33. Therefore, when some abnormality has occurred, resulting heat may be dissipated more quickly on the side of the negative-side charging path 33, resulting is a slower temperature increase there compared with the side of the positive-side charging path 32. Arranging the temperature sensor 31 in the vicinity of the positive-side charging path 32 will enable quick and proper detection of a temperature increase. And, the output signal as a temperature information is constantly transmitted to the control unit 23 of the charger 10. Therefore, the electrical connection between the charger 10 and the electronic apparatus 40 is safe and it makes it possible to provide a charger and an electronic apparatus system that users can use at ease.

In this embodiment, the temperature sensor 31 and the first signal line T1 are arranged in the vicinity of the positive-side charging path 32, are adjacent to the positive-side charging path 32, are arranged at the outer side of the positive-side charging path 32 and are not adjacent to the negative-side charging path 33. This is because of the ease of the manufacture, but the temperature sensor 31 and the first signal line T1 may be arranged where the temperature sensor 31 is able to detect the temperature increase of the connection unit 30 in the vicinity of the positive-side charging path 32. And the output signal as a temperature information may be constantly or intermittently transmitted.

It's described that the temperature sensor 31 is connected to the positive-side charging path 32. It has to be arranged in the vicinity of the positive-side charging path 32, but it doesn't need to be directly connected.

Figure 5B:
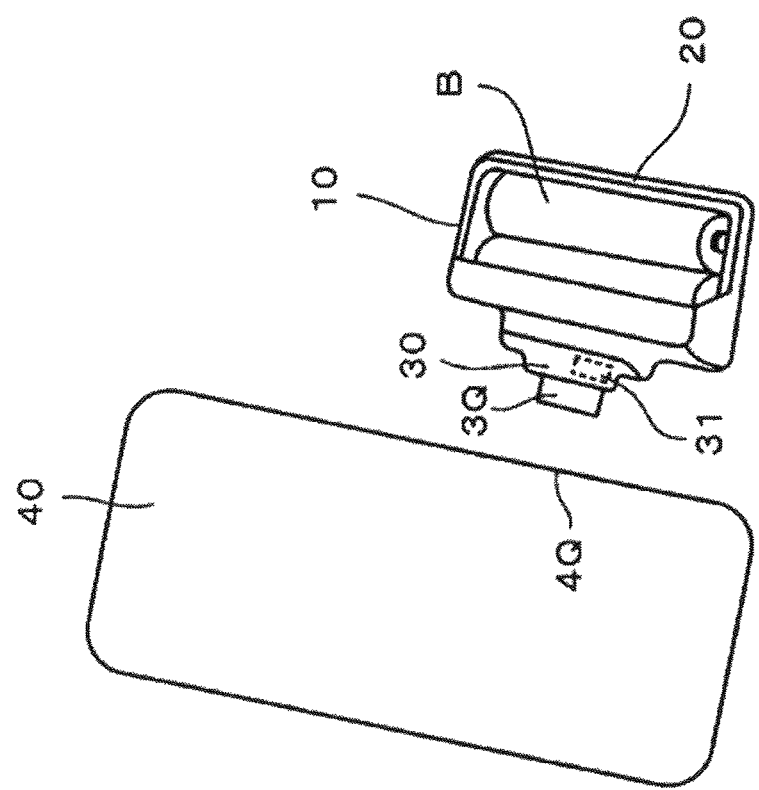

FIGS. 5A and 5B are schematic diagrams of electronic apparatus systems and chargers included therein according to first and second specific embodiments of the present disclosure, respectively.

In the first specific embodiment, the charger 10 is equipped with the plug P and uses an external commercial AC power line as a power source and the charger main body 20 is equipped with the rectifier 21. As shown in FIG. 5A, the temperature sensor 31 is provided in the connection unit 30 which is provided at the tip of the cable K.

The charger 10 according to the second specific embodiment is a portable charger (pocket charger) in which dry cells B or the like are used as a power source. As shown in FIG. 5B, the charger main body 20 and the connection unit 30 are integrated together. And the charging cable K, the first signal lines T1, the positive-side charging path 32, and the negative-side charging path 33 are integrally provided together on the circuits.

The chargers 10 according to the first and second specific embodiments are of the insertion type using a USB terminal, for example. The structure for electrical connection between the connection unit 30 and the electronic apparatus 40 is not limited to the ones employed in the specific embodiments, and may be any of other structures such as a convex/concave engagement structure, a connection structure using connection between contacts, and a connection structure using pin fitting.

Figure 6:
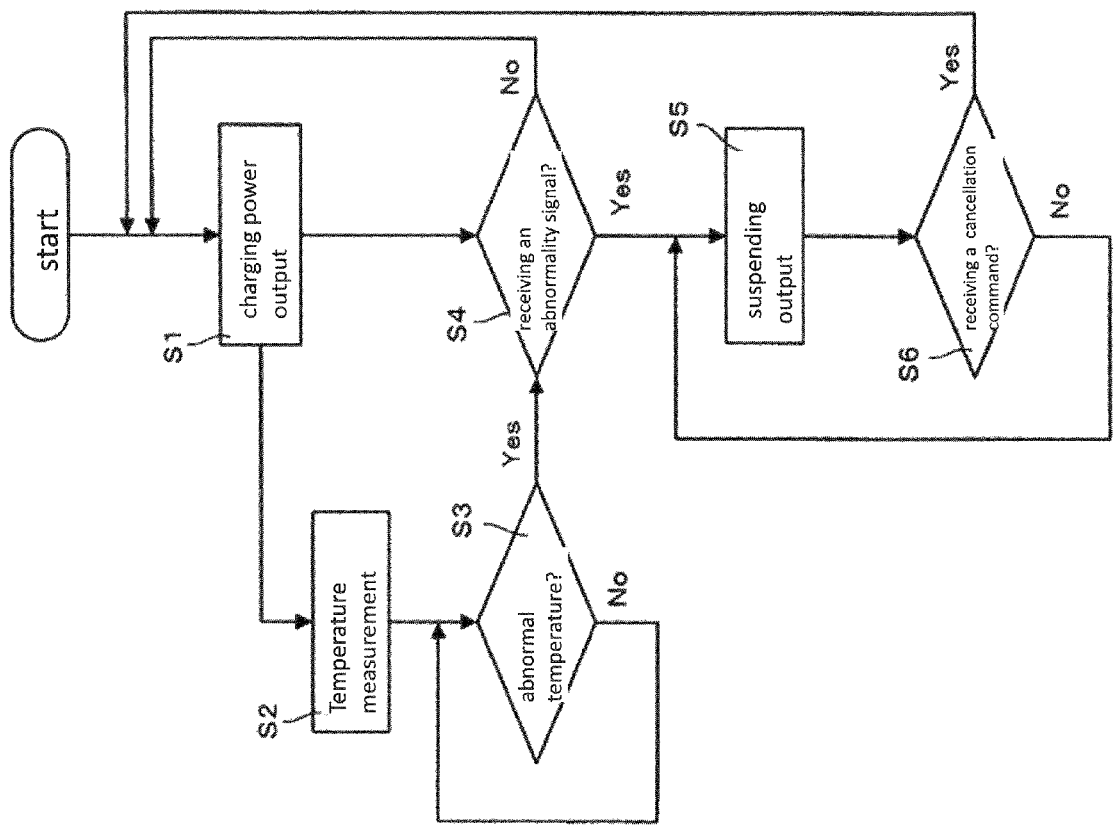
FIG. 6 is a flowchart of an example process which is executed by the charger and the electronic apparatus system according to the embodiment of the present disclosure.

FIG. 6 is a flowchart of an example process which is executed by the charger and the electronic apparatus system according to the embodiment of the present disclosure.

Upon electrical connection between the charger 10 and the electronic apparatus 40, at step S1 the power output unit 22 outputs charging power to charge the secondary battery 60 (quick charging) via the connection unit 30. Upon supply of charging power to the charging path 32, at step S2 the temperature sensor 31 starts measurement of a temperature in the vicinity of the connection unit 30. Temperature information detected by the temperature sensor 31 is transmitted to the temperature abnormality judging unit 23*a* of the control unit 23 in the charger main body 20 through the first signal lines T1 of the charging cable K. At step S3, the temperature abnormality judging unit 23*a* judges whether or not the temperature detected by the temperature sensor 31 is higher than or equal to a prescribed temperature (e.g., 100° C.) on the basis of the received temperature information.

Temperature increase mainly occurs when electrical continuity is established between the positive-side charging path 32 and the negative-side charging path 33 of the charging terminals 3Q and 4Q due to dust, water, or the like. Temperature increase may occur only on the charger 10 side or the electronic apparatus 40 side or due to establishment of electrical connection between the charger 10 and the electronic apparatus 40. Since the temperature sensor 31 is provided in the connection unit 30, danger to occur in the charger 10 itself can be detected and heat generation to occur in the charging terminals 4Q, that is, in the electric path on the side of the electronic apparatus 40 can be detected easily.

If the detected temperature increase is higher than or equal to the prescribed temperature (S3: yes), the temperature abnormality judging unit 23a generates an abnormality signal and sends it to the output suspending unit 23b. At step S4, the output suspending unit 23b judges whether it has received an abnormality signal. If receiving an abnormality signal (S4: yes), at step S5 the output suspending unit 23b suspends the output of charging power from the power output unit 22. The output suspending unit 23b sends an abnormality signal to the output suspension state maintaining unit 23c, which, in response, maintains the output suspension state of the charging power. If not receiving an abnormality signal (S4: no), the output suspending unit 23b maintains the output of charging power from the power output unit 22. The process thereafter returns to step S1.

Unless a proper measure is taken, supply of charging power from the power output unit 22 may be restarted if short-circuiting is removed and the detected temperature thereby become lower than the prescribed temperature. In contrast, in the embodiment, since the output suspension state is maintained by means of the output suspension state maintaining unit 23c, an even dangerous situation such as melting of the connection unit 30 can be avoided. After starting the charging, the user does not watch the charging state. However, since the output suspension state maintaining unit 23c maintains the output suspension state of the charging power in response to the abnormality signal, recurrence of an abnormality state is prevented, whereby a charging environment that is safe for the user can be realized.

At step S6, the output suspension state canceling unit 23d judges whether it has received a suspension state cancellation signal F. If receiving a suspension state cancellation signal F which is a cancellation command generated upon a push of a reset button or the like by the user (S6: yes), the output suspension state canceling unit 23d cancels the output suspension state that has been maintained by the output suspension state maintaining unit 23c. The process thereafter returns to step S1. If the output suspension state canceling unit 23d has not received a suspension state cancellation signal F (S6: no), the process returns to step S5 to maintain the output suspension state.

In step S2, when the charging power is supplied to the positive-side charging path 32, the temperature sensor 31 starts measurement of a temperature in the vicinity of the connection unit 30. Temperature information (output signal) detected by the temperature sensor 31 is transmitted to the temperature abnormality judging unit 23a of the control unit 23 in the charger main body 20 through the first signal lines T1 of the charging cable K. The temperature sensor 31 may constantly measure a temperature. The temperature abnormality judging unit 23a of the control unit 23 is able to receive the output signal from the temperature sensor 31 via the first signal line T1 regardless of whether or not the temperature abnormality judging unit 23a is connected to the electronic apparatus 40.

In the above-describe process, the output suspension state being maintained by the output suspension state maintaining unit 23c is canceled upon reception of a cancellation state cancellation signal. However, an output suspension state may be canceled by shutoff of power to the charger main body 20, which occurs when the user has pulled out the plug P from the socket and then inserted the former into the latter or has removed the dry cells B or the like. When the user pulls out the plug P from the socket, the supply of power to the charger 10 is stopped, as a result of which, for example, the holding state of a latch circuit capable of preventing repetition of restart of a suspension state of the output suspension state maintaining unit 23c can no longer maintained. The output suspension state is thus canceled.

The charging terminals 3Q of the connection unit 30 and the charging terminals 4Q of the electronic apparatus 40 are exposed. Therefore, the connection unit 30 may be connected to the electronic apparatus 40 in a state that dust, water droplets, or the like is attached to the charging terminals 3Q or 4Q, possibly resulting in short-circuiting or a like dangerous event. Since the temperature sensor 31 is provided in the connection unit 30 and the temperature in the vicinity of the connection unit 30 is thereby detected all the time, a temperature increase due to short-circuiting or the like occurring not only between the charging terminals 3Q but also between the charging terminals 3Q and the charging terminals 4Q can be detected easily. This makes it possible to perform fail-safe processing. It means that it is possible to detect the temperature in the vicinity of the connection unit 30 easily and perform fail-safe processing regardless of whether or not the charger 10 and the electronic apparatus 40 are connected to each other. Furthermore, since temperature information can be communicated directly from the connection unit 30 to the charger main body 20 without intervention of the electronic apparatus 40, fail-safe processing can be started quickly.

The present disclosure is not limited the above embodiment, and various modifications, improvements, etc. can be made as appropriate. And the material, shape, dimensions, related numerical values, form of implementation, number (where plural ones are provided), location, etc. of each constituent element of the embodiment are optional and are not restricted as long as the present disclosure can be implemented.

INDUSTRIAL APPLICABILITY

The present disclosure can be applied for the purpose of preventing danger due to heat generation that is caused by short-circuiting or the like in the vicinity of the connection unit of a charger in charging the secondary battery of an electronic apparatus which is a cellphone such as a smartphone, an information terminal such as a tablet PC, a portable terminal with a camera, a digital camera, a measuring instrument, or a detector, or the like.

The present application is based on Japanese Patent Application No. 2013-221329 filed on Oct. 24, 2013, the contents of which are incorporated herein by reference.

What is claimed is:

1. A charger for an electronic apparatus, comprising:
a charger main body which outputs charging power and includes a controller;
a connector which is connectable to the electronic apparatus and is coupled with the charger main body;
a positive-side charging path which extends from the charger main body and transmits the charging power from the charger main body to the electronic apparatus;
a negative-side charging path which extends from the charger main body and is electrically connected to a ground of the charger main body; and
a temperature sensor which is arranged in the vicinity of the positive-side charging path in the connector; wherein
the connector includes a conductive outer wall which surrounds a part of the positive-side charging path and a part of the negative-side charging path, the conductive outer wall is electrically connected to the negative-side charging path, and
the controller receives temperature information detected by the temperature sensor and stops the output of the charging power when temperature detected by the temperature sensor is higher than or equal to a prescribed temperature.

2. The charger according to claim 1, further comprising a first signal line which communicates the temperature information from the temperature sensor to the controller.

3. The charger according to claim 2, wherein the first signal line is an exclusive line for communicating the temperature information of the temperature sensor.

4. The charger according to claim 1, wherein at least a part of the temperature sensor is surrounded by the conductive outer wall.

5. The charger according to claim 1, wherein the temperature sensor is not surrounded by the conductive outer wall.

6. The charger according to claim 1, wherein the connector includes a connector main body, which is covered by an insulator, and a terminal, which is surrounded by the conductive outer wall.

7. The charger according to claim 1, wherein the control unit further comprises:
an output suspending unit, which suspends the output of the charging power if the temperature detected by the temperature sensor is higher than or equal to the prescribed temperature;
an output suspension state maintaining unit, which maintains an output suspension state of the charging power; and
an output suspension state canceller, which cancels the output suspension state of the charging power maintained by the output suspension state maintaining unit when receiving a suspension state cancellation signal.

8. The charger according to claim 1, wherein the control unit further comprises:
an output suspending unit, which suspends the output of the charging power if the temperature detected by the temperature sensor is higher than or equal to the prescribed temperature; and
an output suspension state maintaining unit, which maintains an output suspension state of the charging power, wherein the output suspension state of the charging power that has been maintained by the output suspension state maintaining unit is canceled, if an external supply of power to the charger main body is stopped in the output suspension state of the charging power.

9. The charger according to claim 1, further comprising:
at least one second signal line, which is arranged between the positive-side charging path and the negative-side charging path in at least the connector and communicates a different data than the temperature information from the electronic apparatus.

10. The charger according to claim 9, wherein the charger main body and the connector are connected to each other through a charging cable, and the charging cable includes at least the positive-side charging path, the negative-side charging path, and the second signal line.

11. The charger according to claim 1, wherein the charger main body and the connector are connected to each other through a charging cable, and the charging cable comprises the positive-side charging path and the negative-side charging path.

12. The charger according to claim 1, wherein the charger main body and the connector form a universal serial bus interface, through which the charger is capable of charging the electronic apparatus.

13. The charger according to claim 1, wherein a distance between a center of the temperature sensor and the part of the positive-side charging path in the connector is smaller than a distance between the center of the temperature sensor and the part of the negative-side charging path in the connector.

14. The charger according to claim 1, wherein the conductive outer wall is in contact with the negative-side charging path.

15. The charger according to claim 1, wherein the temperature sensor is connected to the positive-side charging path.

16. The charger according to claim 1, wherein the temperature sensor is adjacent to the positive-side charging path.

17. An electronic apparatus system comprising:
the charger according to claim 1; and
an electronic apparatus.

* * * * *